Figure 3:
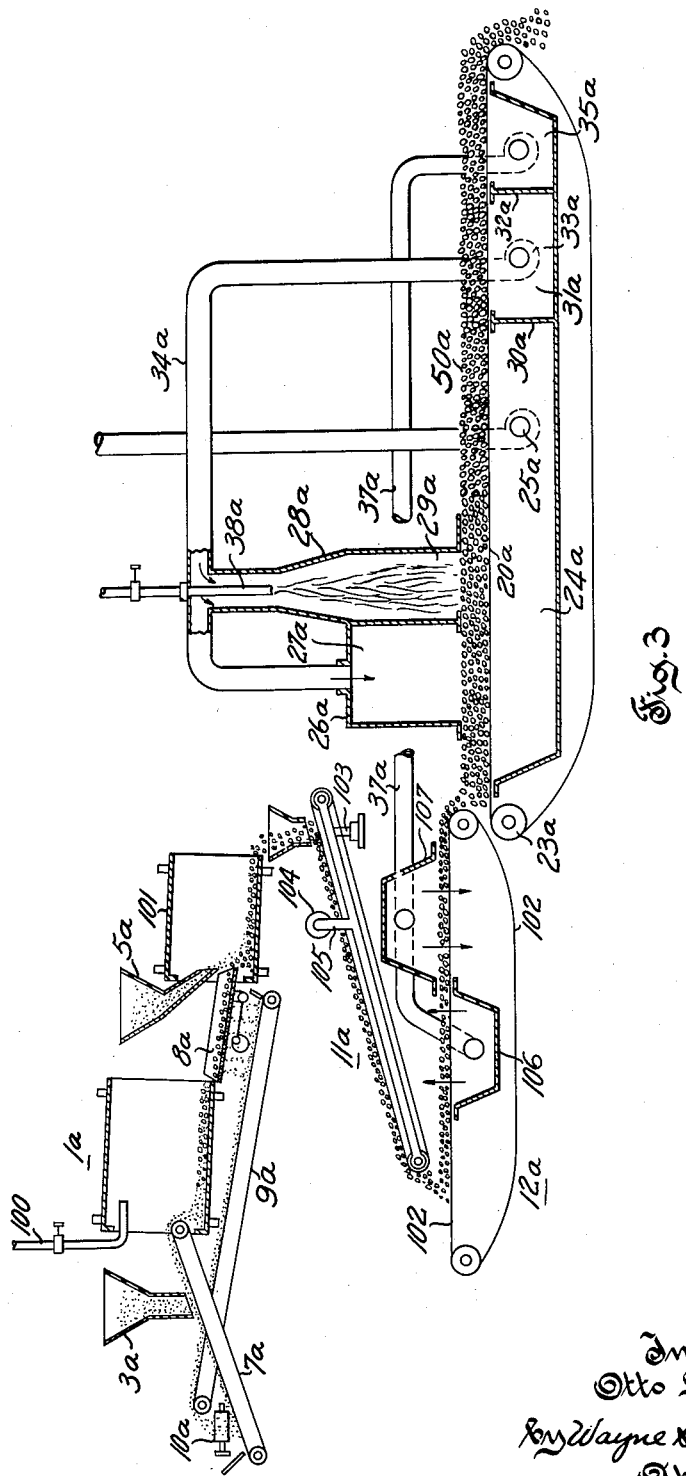

June 12, 1956     O. G. LELLEP     2,750,273
METHOD OF HEAT HARDENING IRON ORE PELLETS CONTAINING FUEL
Filed July 2, 1953     3 Sheets-Sheet 1
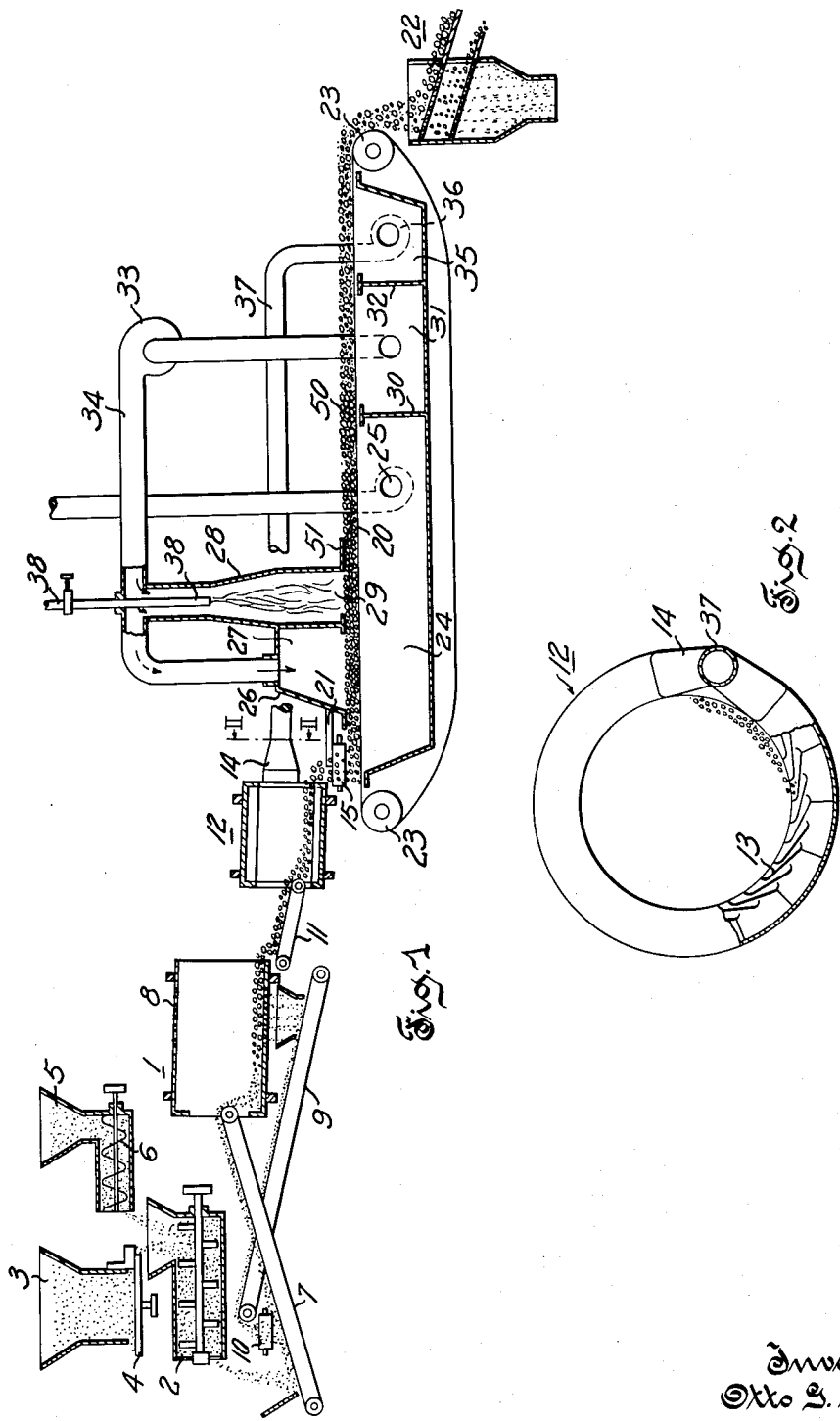
Inventor
Otto G. Lellep
By Wayne B. Easton
Attorney June 12, 1956 — O. G. LELLEP — 2,750,273
METHOD OF HEAT HARDENING IRON ORE PELLETS CONTAINING FUEL
Filed July 2, 1953 — 3 Sheets-Sheet 3

Inventor
Otto G. Lellep
by Wayne B. Easton
Attorney

United States Patent Office 2,750,273
Patented June 12, 1956

2,750,273

METHOD OF HEAT HARDENING IRON ORE PELLETS CONTAINING FUEL

Otto G. Lellep, Wauwatosa, Wis., assignor to Allis-Chalmers Manufacturing Company, Milwaukee, Wis.

Application July 2, 1953, Serial No. 365,752

6 Claims. (Cl. 75—3)

This invention relates generally to a process for agglomerating iron ore and more particularly to the production of hardened pellets of iron ore and this application is a continuation in part of application Serial No. 166,086, filed June 5, 1950, now abandoned.

Various methods of agglomerating, that is, gathering into a ball or mass finely divided ores by sintering on the well known Dwight-Lloyd and Greenawalt sintering machines, and in rotary kilns adapted for nodulization of ores have been practiced heretofore. These methods ordinarily consume on the order of two to three million or more British thermal units per long ton of oxidized iron ore sintered, and result in a sintered or partially vitrified product. For example, in conventional sintering practice, the burning of a mixture of small particles of small size and powdery iron ore and iron ore concentrates and from 6% to 12% coke breeze causes incipient melting of the iron ore at a temperature in the neighborhood of 2450° F. and higher. The small particles of iron ore become fused together forming large lumps of partially vitrified material.

The disadvantages of the prior art methods are that the fusion of ore in sintering and nodulization is uneconomical; and that the semifused ores produced are undesirable in blast furnaces since they reduce too slowly and increase the coke consumption of the blast furnace. The present invention overcomes these disadvantages by pelletizing finely divided iron ores with a very small percentage of admixed fuel containing an amount of free, or as it is generally known, fixed carbon on the order of 2% by weight of the dry ore and burning the pellets on a movable gas-permeable support as described and claimed hereinbelow. By the method of this invention, quantities of separable, porous and easily reducible pellets may be made with a great saving of fuel.

Pellets of iron ore have previously been made and then burned to hardness in vertical or shaft type kilns with good heat economy. The method produces a hard, durable agglomerate of pellets substantially free of vitrification, which is more easily reduced or smelted in the blast furnace or open hearth or the like than is sinter. However, the nature of the process involved in shaft kiln agglomeration makes it subject to numerous disadvantages from a practical viewpoint; namely, difficulties in charging pellets uniformly over the shaft kiln cross section without segregation and breakage of pellets; difficulty in obtaining uniform rates of upward gas flow over all of the cross sectional area of the kiln because of fusion of a quantity of pellets into a gas-impervious mass; irregular and difficult-to-control sliding and hanging of the charge in the kiln; and formation of over-burned dense chunks of fused pellets and underburned parts in the charge.

The process of this invention, on the other hand, avoids the foregoing difficulties since it may be practiced in a moving grate type of heat-hardening machine which has an output four to eight times greater per unit than the output of the shaft kiln. Consequently, the process of this invention lowers labor costs materially. The heat hardening of preformed pellets of iron ore and iron ore concentrates is accomplished in the process of this invention without macroscopic change in shape at a temperature from 2200° F. to 2450° F., which is below sintering temperature. The term "sintering" is used herein as generally understood in the art of sintering concentrated iron ore having an iron content of 60% and higher. Such ores start to sinter, that is, they start to melt partially as may be detected by macroscopic inspection, above 2450° F.

An object of the present invention is to create an improved process for producing an unsintered mass of separate, individual, uniform, hard, shock-resistant, porous, heat-hardened pellets of iron ore comprising finely divided particles of iron oxide and more particularly magnetic iron oxide, and of concentrates of magnetic and nonmagnetic taconite ores, practically free of dust and fines, which will reduce more rapidly in the blast furnace than compact or sintered ores, such as magnetite and the like. Such pellets are macroscopically unmolten, that is, they appear unmolten when viewed with the naked eye.

Another object of the invention is to provide an improved process for burning or heat hardening pellets of finely divided iron oxide ore with freedom from sintering and sprouting and without fusing and cementing the pellets together to form large lumps of difficult-to-reduce material.

Figure 4:
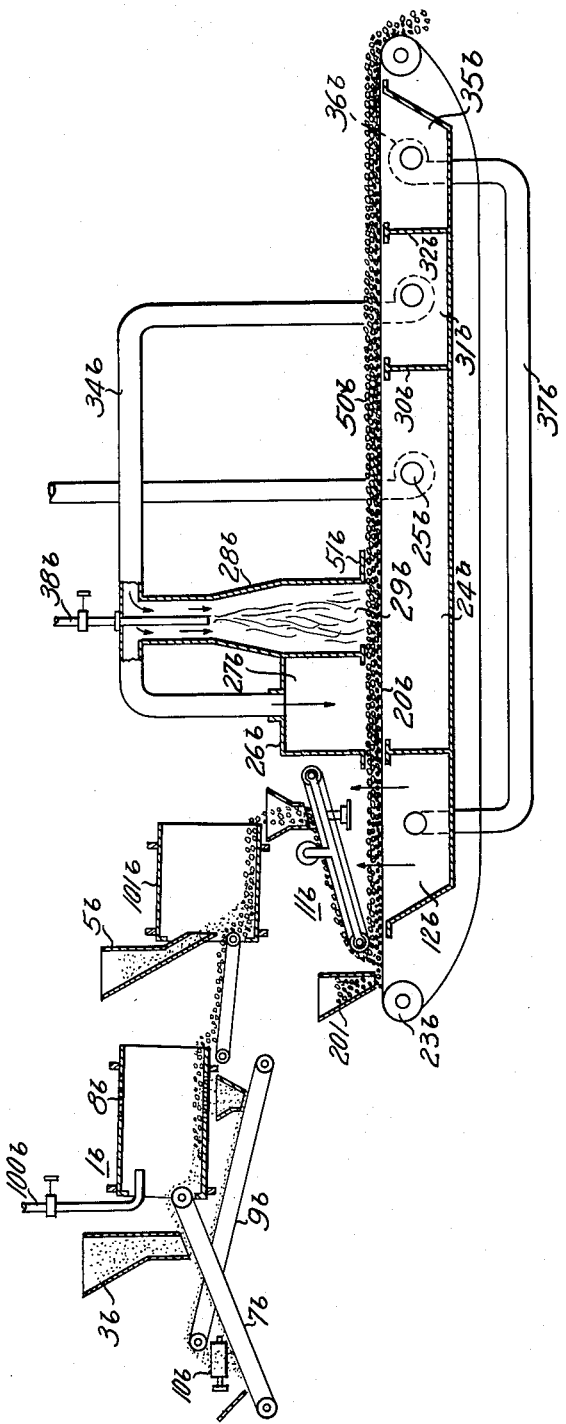

Other objects and advantages will be apparent from the following full, clear and exact description of the process of the present invention and the best mode devised for realizing its advantages. Reference is made in the description to the drawings in which Figs. 1, 3 and 4 represent schematic views of three different pieces of apparatus, each shown in vertical section, with which the process of the present invention may be practiced. Fig. 2 is an enlarged fragmentary section taken on line II—II of Fig. 1, showing details of a rotary louver type dryer.

The process of the present invention is described as carried out respectively on three pieces of apparatus each of which includes a unidirectional traveling grate. But the process can be carried out independently of the specific apparatus shown.

The raw material for which the present process is intended comprises finely divided iron ore, or concentrates thereof, such as are ordinarily obtained by the beneficiation of magnetic and nonmagnetic taconites. This raw material as ordinarily produced is a partially processed material in the form of a moist filter cake containing on the order of 8 to 11 percent moisture, or, if produced dry, it is moistened to this degree.

The process of this invention is carried out by introducing a mixture of moistened iron ore or iron ore concentrates comprising finely divided particles of iron oxide and a finely divided carbonaceous solid fuel into a suitable agglomerating device, briquetting, balling, pelletizing or granulation apparatus, such as, for example, drum 1 in Fig. 1, from a pug mill or other suitable mixing apparatus, such as device 2 of known construction.

Finely ground coke or anthracite passing, for instance, 80% through a two hundred mesh screen is the fuel preferred for mixing with the finely divided iron ore.

Ore or ore concentrates and carbonaceous fuel are supplied to mixer 2 in accurately controlled and regulated amounts in order to provide a mixture of fuel and ore in which the fixed carbon content of the fuel is 0.9 to 2.4 percent of the dry weight of the ore. For magnetic ores a quantity of carbonaceous fuel is preferred which will provide fixed carbon on the order of 0.9 to 1.5 percent of the dry weight of the ore. That is, the feed to balling drum 1 will be a mixture containing about 20 to 33 pounds of ash free, finely divided fixed carbon to one long ton of magnetic ore concentrates; or up to about 53 pounds per long ton if nonmagnetic concentrates are being processed. The designation of "fixed carbon" is herein applied in the sense generally recognized in the metallurgical industry and as defined by the American Society for Testing Materials in its "Standard Methods of Laboratory Sampling and Analysis of Coal and Coke" (Standard D271–48) as follows:

*"Fixed carbon*

"Calculation:

"16. Calculate fixed carbon in coal or coke, as follows: Fixed carbon, per cent=100−(moisture+ash+volatile matter)."

The feeding devices for balling drum 1 comprise a hopper 3 for the iron ore, the hopper 3 being equipped with a rotatable table feed device 4, and a hopper 5 for the fuel, the hopper 5 being equipped with a screw conveyor 6. Feed device 4 and screw conveyor 6 may be regulated to feed desired amounts of ore and fuel to mixing device 2. The mixture of ore and fuel from mixing device 2 is conveyed on a traveling conveyor 7 to balling drum 1.

In balling drum 1, the material, in a known manner, is formed into balls or pellets, preferably of sizes not smaller than one quarter of an inch in diameter nor larger than about three quarters of an inch in diameter, although some variation beyond these limits is permissible. Balling drum 1 has a cylindrical screen section 8 at its discharge end which passes undersized pellets for return to the feed end of balling drum 1 via endless belt conveyors 9, 10 and 7. The undersized pellets are utilized in balling drum 1 as seed pellets.

Moist pellets containing 8 to 11 percent moisture are discharged from balling drum 1 onto an endless belt conveyor 11. From the conveyor 11 moist pellets are fed to a rotatable louver type drying drum 12 wherein the pellets are dried to a moisture content of 7 to 8 percent so as to be able when placed upon grate 20 to support other pellets placed on top of them without being crushed. Drying drum 12, as shown in Fig. 2, comprises louver elements 13 and a manifold 14 through which a drying gas from a later step in the process is conveyed into drum 12 from a conduit 37. Louvers 13 move successively into a zone extending longitudinally from manifold 14 and the drying gas flows inwardly between the louvers in that zone and through the pellets contained in drying drum 12.

The pellets are discharged from drying drum 12 onto an endless belt conveyor 15 from which the pellets are deposited in a layer of substantially uniform depth on the feed end of a traveling, gas-permeable grate 20, preferably of the endless type well known in the sintering machine art and having side plates (not shown). Suitable scrapers 21 of known construction may be utilized in connection with conveyor 15 to facilitate an even distribution of pellets across the width of grate 20. If desired, a thin layer of burned pellets, preferably of the smaller sizes, may be deposited on grate 20 in advance of the pellets deposited from conveyor 15 for protection of the grate. The uniform layer of pellets moves to the right with the grate 20 in the device illustrated and the layer is continuously formed by pellets fed from conveyor 15.

Burned pellets discharged from grate 20 are ordinarily separated, for example, by a double decked screen 22, or the like, into large finished heat-hardened pellets, small or medium pellets useful for forming a protective layer on the grate, and fines and dust which may be added to the charge in the balling drum to improve the strength of the green pellets.

The grate 20 is mechanically moved by power driven rollers or sprockets 23; and its upper flight is supported by known means (not shown), as in known types of traveling grate machines.

The traveling grate machine shown in Fig. 1 is provided with a suction box 24, closed at the top by the gas-permeable grate 20; and power driven exhaust fan means is connected with suction box 24 at 25, to exhaust gases of combustion therefrom. Directly above suction box 24, and adjacent to conveyor 15, is a drier hood 26, separated from suction box 24 by grate 20 and the layer of pellets on it. The space under hood 26 and between the side plates of grate 20 constitutes a drying chamber 27, through which all material placed on the grate passes. A second or firing hood 28 is arranged over suction box 24 and grate 20, adjacent drier hood 26 in the direction of travel of the grate; and the space under firing hood 28 and between the side plates of grate 20 constitutes a heating and ignition chamber 29.

Suction box 24 extends considerably beyond the end of firing hood 28 in the direction of travel of grate 20 and is closed by a transverse wall 30. To the right and adjacent suction box 24 at end wall 30, is a second suction box 31 arranged below the grate 20 and closed by an end wall 32. To suction box 31 is connected exhaust fan means 33 which discharges through conduit 34 to firing hood 28 and drier hood 26. To the right and adjacent suction box 31, is a third suction box 35 arranged below grate 20. The gaseous contents of suction box 35 are conveyed by exhaust fan means 36 through conduit 37 to drying drum 12.

A fuel supply inlet such as nozzle 38, of known type, introduces gas, oil or powdered coal into firing hood 28 where it is ignited and burned to produce a flame.

Suitable thermocouples are preferably placed in the drier hood, firing hood and suction boxes and utilized to control gas flows, in known manner.

In the process of the present invention, the partly dried green pellets discharged from conveyor 15 are deposited freely and loosely on grate 20 so as to form a thick gas-permeable layer 50 of substantially uniform depth, preferably in the neighborhood of fourteen to eighteen inches. The green pellets are preferably superimposed on a thinner grate-protecting layer of burned pellets, the protective layer being about two inches thick. The depths of layer given are suitable for pellets averaging about five eighths of an inch in diameter on a grate of the style shown, but may vary, for different sizes of pellets and styles of grates, from about twenty to about fifty times the diameter of the average pellet.

While passing through drying chamber 27, the green pellets are dried gradually by moderately heated drying gases drawn downward through layer 50 by exhaust fan 25. The speed of grate 20 and the gas flow are so coordinated that at least the pellets at the top of layer 50 are thoroughly dried by the time they enter chamber 29. Suitable fuel, entering hood 28 through nozzle 38, is burned in a supply of heated air from conduit 34 to create a heating and ignition flame in hood 28 which is drawn or projected downward into the layer 50 as by exhaust fan 25, and heats the dried pellets at the top of layer 50 passing through chamber 29 to white heat. When the fuel and air supply to hood 28 are properly coordinated with the grate speed, a zone of burning pellets, hereafter known as the burning zone, is formed at the top of layer 50 to at least a depth of 10% (and preferably about 13%) of the layer depth before the heated pellets leave the chamber 29. The heating intensity of the flame is so adjusted that the temperature of the pellets in the burning zone exceeds the temperature required for ignition or heat-producing reaction of the fixed carbon in the fuel but does not rise to or exceed the sintering or incipient melting temperature of the ore being treated. Suitable temperatures for heat hardening without sintering range from 2200° to 2450° F.

The layer of pellets 50 with the burning zone established at the top of the layer, passes beyond the end of firing hood 28 and chamber 29, where atmospheric air, or other suitable oxidizing gas, is drawn downwardly through the layer into suction box 24. The current of air drives the burning zone progressively downward in the direction of the air flow, which is transverse to layer 50, supporting an exothermic combustion of carbon and carbon monoxide in the burning zone, and exothermic oxidation of the iron oxide in the case of magnetic oxides, such as will be readily understood by persons skilled in the metallurgical arts. The velocity of air flow and the speed of grate 20 are so regulated that the burning zone will have entirely traversed the layer of green pellets, in a wave like sense, when the layer reaches wall 30.

After layer 50 passes wall 30, suction in the second suction box 31 draws a current of cooling air downward through the layer of heat hardened pellets. The pellets effect a heat exchange with the air current, which is discharged through conduit 34 to firing hood 28 and drying hood 26 where it is made available for the drying and heating steps and for promoting combustion of fuel in firing hood 28. The step of directing a current of air downward through layer 50 of heat-hardened pellets, instead of upward, has the advantage that air directed downward becomes heated to a higher temperature than would air directed upward. At this stage in the process the upper portion of layer 50 is cool and the bottom portion is relatively hot. If air were directed upward through layer 50 the cool pellets in the upper portion of the layer would absorb heat from the air and the temperature of the air conveyed to drying chamber 27 and ignition chamber 29 would be lower than when the air is directed downward through the layer.

It is necessary to dry at least the moist green pellets in the top of layer 50 in chamber 12 by means of the gases from suction box 31 which are heated to a temperature from 300° F. to 500° F. in order to prevent disintegration of the pellets by sudden heating and steam formation that would occur if pellets with seven to eight percent moisture were exposed to the direct flame at about 2350° F. Any pellets at the bottom of layer 50 which may not be fully dried before passage into chamber 29, or before the heating and ignition flame is applied to the top of the layer, will be dried sufficiently gradually by the gases passing through the stream of pellets in chamber 29, which gases are greatly reduced in temperature by a heat exchange with pellets higher in the layer before the gases reach any pellets which may still be in an only partially dried condition at the bottom of the layer.

The heating of the top of the stream or layer to create a burning zone approximately 13% of the layer depth (the total layer depth being, for example, twenty to fifty times the average pellet size) is necessary in order that the burning zone may be securely maintained, after its creation, and driven downward through the layer by the current of air alone. The rate of travel of the burning zone through the layer is adjusted to heat each pellet through to a degree sufficient to consume the admixed carbon and thoroughly bake or heat harden the pellet without sintering or incipient melting. In this burning zone of preheating and combustion, each pellet remains at the highest temperature for from two to ten minutes at the speeds of draft and grate employed in the process. The burning zone is maintained at a temperature of 2200° F. to 2450° F., sufficient to ignite the fuel, and below the incipient melting temperature of the ore. At this temperature the process can produce the porous, heat-hardened, but unsintered mass of separate individual pellets which is the desired product of the present process by causing the ore particles within each pellet to adhere together by diffusion and crystal growth without fusion of the pellets together. The ignition, or initial high temperature heating flame is drawn or projected into the top of the layer of pellets for a period in the neighborhood of three minutes, as compared with a period of one minute or so in the prior art sintering processes in which the ores have a particle size as charged on the grate much smaller than the size of the pellets in the present method, and in which a much greater proportion of admixed fuel is used.

In carrying out the process of this invention on the illustrated apparatus, any suitable known means (not shown) for regulating the flows and temperatures of gases may be employed, so that the drying, heating and combustion of admixed fuel in the whole charge of layer 50 is essentially completed over suction box 24, the temperature peak in the lowermost green pellets occurring before they reach wall 30. Above suction box 31, the charge, already somewhat cooled at the top, is further cooled with air drawn downward through layer 50, so that by the time of discharge at 22, the charge contains only a minor part of the heat produced. The heat absorbed by the cooling air is then utilized in the process, as carried out on the apparatus shown, in the drying of pellets at chamber 27 and in supporting combustion and creating a heating and ignition flame in firing hood 29. Loss of radiant heat may be prevented by a suitable refractory roof 51 extending a short distance in the direction of travel of the grate from firing hood 28 and spaced from the top of the layer 50. This means preserves some of the heat otherwise lost by radiation from the incandescent top of the burning zone as the stream of pellets moves beyond the firing hood proper, enough space being left between roof 51 and the top of the layer of pellets to permit free flow of air or oxidizing gas to the top of the layer. By the time the pellets pass beyond the roof 51, the uppermost pellets are sufficiently cooled by downdraft so that excessive radiation losses are avoided.

In Fig. 3 the traveling grate machine is the same as that shown to the right of drying drum 12 in Fig. 1. Fig. 3, however, shows different apparatus for preparing the pellets to be charged on the grate of the traveling grate machine. Each element of apparatus in Fig. 3 corresponding or similar to an element of apparatus in Fig. 1 is designated by the same reference numeral with the suffix "a" added.

The main difference between the apparatus shown in Figs. 1 and 3, is that means are provided in the apparatus of Fig. 3 for forming pellets by coating balls of iron ore with a layer of solid fuel instead of admixing fuel with the iron ore and subsequently forming pellets as done with the apparatus shown in Fig. 1. It has been found by experiment that pellets containing hematite burn to a harder consistency when the fuel is on their surface than when the fuel is distributed throughout the pellets. The fuel for coating the iron ore may comprise finely ground coke or anthracite passing 80% through a two hundred mesh screen, but finer ground coal adheres better to the surface of the ore.

In Fig. 3, a hopper 3a supplies finely divided concentrated iron ore, and suitable feeding means (not shown) supplies ore at the desired rate to an endless belt conveyor 7a which delivers the ore to a balling drum 1a. Balls are formed most efficiently in balling drum 1a when the moisture content of the ore is between 8 and 11 percent. A water pipe 100 is provided for adding water to raise the moisture content to that amount, if necessary. Balls formed in balling drum 1a are preferably formed in sizes between one quarter and three quarters of an inch in diameter although some variation beyond these limits is permissible. Formed balls from balling drum 1a are discharged to a shaking screen 8a from which balls of suitable size are delivered to a rotatable coating drum 101. Undersized balls are returned to the feed end of balling drum 1a via endless belt conveyors 9a, 10a and 7a, the undersized balls being utilized in balling drum 1a as seed balls.

A hopper 5a is provided for supplying a dry powdered fuel to coating drum 101 wherein the iron ore balls are uniformly coated with particles of the fuel during rotation of the coating drum. Means (not shown) are provided for feeding the powdered fuel into coating drum 101 at a desired rate corresponding to the rate at which ore is fed from hopper 3a. The quantity of fuel necessary for iron ores generally is that quantity which when coated on an iron ore ball will provide fixed carbon in the amount of 0.9 to 2.4 percent of the dry weight of the iron ore contained in the pellet. For pellets of magnetite iron ore, the coated fuel should provide fixed carbon in an amount preferably from 0.9 to 1.5 percent.

Pellets coated with a layer of fuel particles and containing 8 to 11 percent moisture are discharged from coating drum 101 onto an endless belt conveyor 11a from which the pellets are fed to an endless screen type dryer 12a. For simplicity of operation dryer 12a is provided with an endless screen 102 having the same width as the endless grate 20a of the traveling grate machine. Conveyor 11a is pivoted at 103 for oscillatory motion and a mechanism 104 of any suitable known construction has a reciprocating arm 105 connected to the conveyor for causing the discharge end of the conveyor to move back and forth across the width of dryer 12a so that pellets are distributed evenly on the endless screen 102 of the dryer.

Dryer 12a is provided with wind boxes 106 and 107 to which a heated drying gas is delivered from another stage of the process through conduit 37a. Pellets are deposited from conveyor 11a onto endless screen 102 in a layer two or three inches thick and then are dried to a moisture content of 7 to 8 percent by the drying gas as the layer of pellets moves over wind box 106 and beneath wind box 107. Pellets are deposited from endless screen 102 onto grate 20a of the traveling grate machine to form a layer of pellets about fourteen to eighteen inches thick. Endless screen 102 is operated with a linear speed considerably greater than the linear speed of grate 20a so that a layer of pellets of the proper thickness is continuously maintained on grate 20a. Further treatment of the layer of pellets on grate 20a is the same as in the traveling grate machine shown in Fig. 1.

In the apparatus shown in Fig. 4 the traveling grate machine is similar to the traveling grate machines shown in Figs. 1 and 3 except that in the machine of Fig. 4, structure is included at the feed end to direct a drying gas upward through the layer of pellets prior to the passing of a drying gas downward through the layer. This additional drying structure on the traveling grate machine eliminates the need for including a separate drying unit such as the rotatable louver type drying drum 12 in Fig. 1 or the endless screen type dryer 12a in Fig. 3 with the pellet-preparing apparatus. Each element of apparatus in Fig. 4 corresponding or similar to an element of apparatus in Figs. 1 and 3 is designated by the same reference numeral with the suffix "b" added.

Except for the elimination of the endless screen dryer 12a of Fig. 3, the apparatus for preparing pellets to be charged onto grate 20b in Fig. 4 is substantially the same as the corresponding apparatus in Fig. 3. In Fig. 4, however, a cylindrical screen section 8b and an endless belt conveyor are substituted for the vibrating screen 8a of Fig. 3.

In Fig. 4, pellets with an 8 to 11 percent moisture content are deposited from conveyor 11b onto grate 20b to form a layer of pellets about fourteen to eighteen inches thick. A wind box 12b provided beneath grate 20b receives a heated drying gas from another stage in the process through conduit 37b in the same manner that a heated drying gas is supplied to drying drum 12 in Fig. 1 and to endless screen dryer 12a in Fig. 3. The drying gas in wind box 12b which flows upward through grate 20b and the pellets dries mostly the lower pellets in the layer. As the layer moves into drying chamber 27b a heated drying gas is directed downward through the layer, as in the apparatus of Figs. 1 and 3, to dry the upper pellets in the layer to substantially zero water content. The drying gas flowing downward through the layer from chamber 27b absorbs moisture from the upper pellets and a portion of this moisture is absorbed by the lower pellets. The step of initially removing moisture from the lower pellets in the layer above wind box 12b reduces the water content of the lower pellets to the extent that the lower pellets can absorb moisture in chamber 27b and still have sufficient strength to support the pellets in the upper portion of the layer without being deformed or crushed.

In the traveling grate machines of Figs. 1 and 3, the pellets are dried to a moisture content of 7 to 8 percent before being deposited on grates 20 and 20a, respectively. Although the lower pellets in layer 50 in chamber 27 of Fig. 1 (or chamber 27a of Fig. 3) absorb moisture from the drying gas so that their moisture content is increased without exceeding the original moisture content of about 10 percent, the lower pellets can support the upper pellets in the layer without being deformed. If pellets having a moisture content of 8 to 11 percent were deposited on grate 20 of Fig. 1 (or grate 20a of Fig. 3) the moisture content of the lower pellets of the layer in drying chamber 27 would be increased to the extent that the lower pellets in the layer would not be strong enough to support the upper pellets.

In the apparatus of Fig. 4 a hopper 201, continuously supplied with small burned pellets, may be provided for depositing a relatively thin layer of burned pellets on grate 20b, in advance of the pellets deposited by conveyor 11b, to protect the grate.

Although the process may be most economically carried out on a continuously traveling grate machine of the type shown in Figs. 1, 3 and 4, other more or less equivalent apparatus can be used, such as intermittently working pans or cars of known types with gas-permeable bottoms. Heated air obtained from cooling one car or pan may be used for drying pellets in another car and heating pellets in still another. A continuously moving series of separate cars with gas-permeable bottoms can be used to make pellets in layers up to three or four feet deep, such as may be desirable when the pellets are of a size up to one and one-quarter inches in diameter or larger, or when sponge iron is to be produced, or whenever a pellet size larger than the one-quarter to three-quarters inch diameter mentioned above is desired. The process may even be carried out as a batch process on any stationary gas-permeable grate, or other gas-permeable support for a layer of pellets, by successively exposing the layer to suitable currents of moderately heated drying gases, high temperature heating and ignition gases, air for promotion of hot zone combustion, and air for cooling, for suitable periods, the heated cooling air being utilized for the drying, heating and ignition of a succeeding batch of pellets.

Pellets of magnetic iron oxide ores require somewhat less heat by addition from the flame and combustion of the fixed carbon contained in the pellets than nonmagnetic ores require, because magnetite ($Fe_3O_4$) is partially oxidized in the process into hematite or ferric oxide ($Fe_2O_3$) and higher iron oxides, and this reaction is exothermic to the extent of about 150 B. t. u. per pound. Little additional heat is therefore needed for magnetic iron oxide ores, as a large part of the heat for maintenance of the hot zone by air blast alone is produced by this exothermic reaction which increases the oxygen content of the pellets without fuel consumption.

The total fuel requirement for the present process (including fuel added to the pellets and fuel for the pellet heating and ignition flame) should be held below 1,200,000 B. t. u. per long ton of ore, for nonmagnetic iron oxide ores, and between 400,000 and 800,000 B. t. u. per long ton of ore for the magnetic ores. Ores containing a mixture of hematite and magnetite have a fuel requirement between these limits.

If the percentage of fuel contained in the pellets and the peak pellet temperatures are kept low, a condition known as "sprouting," in which a complicated reaction of carbon and silica bearing constituents of the ore produces a low melting temperature slag that is exuded or bursts in drop like form from the oxidized crust of the pellets and has the appearance of small Brussels sprouts. Sprouting casues objectionable cementing together of the pellets and resultant fused masses of pellets. The slag produced in "sprouting" is moreover difficult to reduce in a blast furnace.

It has been found desirable in producing hardened pellets of magnetic taconite concentrates to apportion the fuel added to the pellets, in the form of coke breeze, to about 1.2% by weight of the dry ore, the actual quantity of admixed fixed carbon being only 1.08% of the dry weight of the ore. With this small quantity of fuel supplying 60–70% of the total heat requirement, the other 30–40% being supplied by the heating and ignition flame, pellets made from magnetite, sufficiently hard to withstand the necessary transportation and the impacts and pressures incident to handling in the blast furnace and open hearth processes, are produced with a total heat consumption in the neighborhood of only about 500,000 B. t. u. per long ton of ore.

*Example.*—The process has been carried out with finely divided magnetic taconite concentrates pelletized with 1.3% admixed coke (about 1.14% fixed carbon) in a twenty inch layer of which eighteen inches were green pellets and two inches grate protection. The average pellet size was five-eighths inches; drying time was ten minutes with drying gases at a temperature of 500° F.– 550° F. Ignition time was three and one-half minutes; flame temperature as indicated by an ordinary thermocouple in the flame was 2250° F. After ignition, cold air was drawn down through the layer for twenty-nine minutes. The temperature peak in the lowest green pellets was reached twelve minutes before discharge from the grate. The hot air from below the grate during the last twelve minutes averaged 850° F. and was usable as heated air in the drying and ignition steps.

The process and apparatus described can be simplified by omitting the predrying and heat recuperation. For instance, it is feasible to shorten the time of operation or treatment on the grate by igniting the undried pellets with a flame produced by burning fuel with cold air. The pellets crack or disintegrate to some extent and more fines are found in the product. As soon as the heat wave has passed to the bottom of the layer the pellets can be discharged without cooling partly in white hot state. By using this simplified method of burning pellets the quality of pellets is lowered due to presence of fines and the heat consumption is increased considerably. By omitting the predrying, cooling and heat recuperation from the grate, the same grate area can produce up to twice as many pellets and the capital cost is lowered correspondingly. The heat economy and quality of pellets has to be balanced against the capital cost under each particular condition.

It will be apparent that the process described herein is susceptible to minor variations in practice and that the specifically illustrated apparatus may also be modified in detail without departing from the spirit of the invention. The invention accordingly includes such modifications and variations as may reasonably be considered as within the scope of the appended claims.

It is claimed and desired to secure by Letters Patent:

1. A process for producing an unsintered mass of separate, individual, shock-resistant, heat-hardened, iron ore pellets from green, water-bound, iron ore pellets of a size ranging substantially from one-quarter inch to three-quarter inch, said process comprising the steps of forming said green water-bound pellets from finely divided carbonaceous solid fuel and concentrated iron ore comprising finely divided particles of iron oxide, said green pellets containing said fuel in a quantity to provide fixed carbon in the amount of 0.9 to 2.4 percent of the dry weight of said ore; depositing said green pellets upon a moving gas-permeable support to form a generally horizontal gas-permeable layer in which substantially all of said green pellets range in size from one-quarter inch to three-quarter inch; moving said layer generally horizontally through a drying chamber while passing a heated drying gas in a transverse direction through said layer to cause the green pellets adjacent a surface of said layer to be thoroughly dried; moving said layer generally horizontally through an ignition chamber while directing a flame transversely into said layer in the same direction as said drying gas to establish a burning zone in which the carbon contained in the pellets in the burning zone is ignited and the pellets in the burning zone are heated to a temperature between 2200° F. and 2450° F.; and moving said layer generally horizontally out of said ignition chamber while directing a flow of air transversely through said layer in the same direction as said flame and said drying gas to maintain said burning zone in an oxidizing atmosphere and to move said burning zone transversely through said layer for successively heating the remainder of the pellets in said layer to said temperature in said oxidizing atmosphere as said burning zone traverses said layer to cause adherence of said finely divided particles in each pellet through diffusion and crystal growth and to cause each pellet to harden nonfused to adjacent pellets.

2. A process for producing an unsintered mass of separate, individual, shock-resistant, burned iron ore pellets from green, water-bound, iron ore pellets of a size ranging substantially from one-quarter inch to three-quarter inch, said process comprising the steps of forming said green water-bound pellets from finely divided carbonaceous solid fuel and concentrated iron ore comprising finely divided particles of iron oxide, said green pellets having a moisture content of eight to eleven percent and containing said fuel in a quantity to provide fixed carbon in the amount of 0.9 to 2.4 percent of the dry weight of said ore; depositing said green pellets upon a moving gas-permeable support to form a generally horizontal gas-permeable layer in which substantially all of said green pellets range in size from one-quarter inch to three-quarter inch; moving said layer generally horizontally through a first drying chamber while passing a heated drying gas upward through said layer to cause pellets in the lowermost portion of said layer to have a moisture content less than the moisture content of pellets in the uppermost portion of said layer, moving said layer generally horizontally through a second drying chamber and passing heated drying gases downward through said layer to cause the pellets in the uppermost portion of said layer to be thoroughly dried; moving said layer generally horizontally through an ignition chamber while directing a flame downward into said layer to establish a burning zone at the top of said layer in which the carbon contained in the pellets in the burning zone is ignited and the pellets in the burning zone are heated to a temperature between 2200° F. and 2450° F.; and moving said layer generally horizontally out of said ignition chamber while directing a flow of air downward through said layer to maintain said burning zone in an oxidizing atmosphere and to move said burning zone downward through said layer for successively heating the remainder of the pellets in said layer to said temperature in said oxidizing atmosphere as said burning zone traverses said layer to cause adherence of said finely divided particles in each pellet through diffusion and crystal growth and to cause each pellet to harden nonfused to adjacent pellets.

3. A process for producing an unsintered mass of separate, individual, shock-resistant, heat-hardened, iron ore pellets from green, water-bound, iron ore pellets of a size ranging substantially from one-quarter inch to three-quarter inch, said process comprising the steps of forming said green water-bound pellets from concentrated iron ore comprising finely divided particles of iron oxide, coating said green pellets uniformly with finely divided carbonaceous solid fuel in a quantity to provide fixed carbon in the amount of 0.9 to 2.4 percent of the dry weight of said ore; depositing the coated pellets upon a moving gas-permeable support to form a generally horizontally gas-permeable layer in which substantially all of said coated pellets range in size from one-quarter inch to three-quarter inch; moving said layer generally horizontally through a drying chamber while passing a heated drying gas in a transverse direction through said layer to cause the coated pellets adjacent a surface of said layer to be thoroughly dried; moving said layer generally horizontally through an ignition chamber while directing a flame transversely into said layer in the same direction as said drying gas to establish a burning zone in which the carbon coated on the pellets in the burning zone is ignited and the pellets in the burning zone are heated to a temperature between 2200° F. and 2450° F.; and moving said layer generally horizontally out of said ignition chamber while directing a flow of air transversely through said layer in the same direction as said flame and said drying gas to maintain said burning zone in an oxidizing atmosphere and to move said burning zone transversely through said layer for successively heating the remainder of the coated pellets in said layer to said temperature in said oxidizing atmosphere as said burning zone traverses said layer to cause adherence of said finely divided particles in each pellet through diffusion and crystal growth and to cause each pellet to harden nonfused to adjacent pellets.

4. A process for producing an unsintered mass of separate, individual, shock-resistant, heat-hardened, iron ore pellets from green, water-bound, iron ore pellets of a size ranging substantially from one-quarter inch to three-quarter inch, said process comprising the steps of forming said green water-bound pellets from finely divided carbonaceous solid fuel and concentrated iron ore comprising finely divided particles of iron oxide, said green pellets containing said fuel in a quantity to provide fixed carbon in the amount of 0.9 to 2.4 percent of the dry weight of said ore; depositing said green pellets upon a moving gas-permeable support to form a generally horizontal gas-permeable layer in which substantially all of said green pellets range in size from one-quarter inch to three-quarter inch; moving said layer generally horizontally through an ignition chamber while directing a flame transversely into said layer to establish a burning zone in which the carbon contained in the pellets in the burning zone is ignited and the pellets in the burning zone are heated to a temperature between 2200° F. and 2450° F.; and moving said layer generally horizontally out of said ignition chamber while directing a flow of air transversely through said layer to maintain said burning zone in an oxidizing atmosphere and to move said burning zone transversely through said layer for successively heating the remainder of the pellets in said layer to said temperature in said oxidizing atmosphere provided by said air as said burning zone traverses said layer to cause adherence of said finely divided particles in each pellet through diffusion and crystal growth and to cause each pellet to harden nonfused to adjacent pellets.

5. A process for producing an unsintered mass of separate, individual, shock-resistant, burned iron ore pellets from green, water-bound, iron ore pellets of a size ranging substantially from one-quarter inch to three-quarter inch, said process comprising the steps of forming said green water-bound pellets from finely divided carbonaceous solid fuel and concentrated iron ore comprising finely divided particles of iron oxide, said green pellets containing said fuel in a quantity to provide fixed carbon in the amount of 0.9 to 2.4 percent of the dry weight of said ore; depositing said green pellets upon a moving gas-permeable support to form a generally horizontal gas-permeable layer in which substantially all of said green pellets range in size from one-quarter inch to three-quarter inch; moving said layer generally horizontally through a drying chamber while passing a heated drying gas upward through said layer to cause the pellets in the lowermost portion of said layer to have a moisture content less than the moisture content of the pellets in the uppermost portion of said layer; moving said layer generally horizontally through an ignition chamber while directing a flame downward into said layer in the same direction as said drying gas to establish a burning zone in the uppermost portion of said layer in which the carbon contained in the pellets in the burning zone is ignited and the pellets in the burning zone are heated to a temperature between 2200° F. and 2450° F.; and moving said layer generally horizontally out of said ignition chamber while directing a flow of air transversely through said layer in the same direction as said flame to maintain said burning zone in an oxidizing atmosphere and to move said burning zone downward through said layer for successively heating the remainder of the pellets in said layer to said temperature in an oxidizing atmosphere provided by said air as said burning zone traverses said layer to cause adherence of said finely divided particles in each pellet through diffusion and crystal growth and to cause each pellet to harden nonfused to adjacent pellets.

6. A process for producing an unsintered mass of separate, individual, shock-resistant, heat-hardened, iron ore pellets from green, water-bound, iron ore pellets of a size ranging substantially from one-quarter inch to three-quarter inch, said process comprising the steps of forming said green pellets from finely divided carbonaceous solid fuel, and concentrated iron ore comprising finely divided particles of magnetite, said green water-bound pellets containing said fuel in a quantity to provide fixed carbon in the amount of 0.9 to 2.4 percent of the dry weight of said ore, depositing said green pellets upon a moving gas-permeable support to form a generally horizontal gas-permeable layer in which substantially all of said green pellets range in size from one-quarter inch to three-quarter inch, moving said layer generally horizontally through an ignition chamber while directing a flame transversely into said layer to establish a burning zone in which the carbon contained in the pellets in the burning zone is ignited and the pellets in the burning zone are heated to a temperature between 2200° F. and 2450° F.; and moving said layer generally horizontally out of said ignition chamber while directing a flow of air transversely through said layer to maintain said burning zone in an oxidizing atmosphere to convert said pellets in said zone from magnetite to hematite and to move said burning zone transversely through said layer for successively heating the remainder of the pellets in said layer to said temperature in said oxidizing atmosphere as the burning zone traverses the layer to cause adherence of said finely divided particles in each pellet through diffusion and crystal growth and to cause each pellet to harden nonfused to adjacent pellets.

References Cited in the file of this patent

UNITED STATES PATENTS

| 1,020,345 | Dwight et al. | Mar. 12, 1912 |
| 1,221,962 | Bittmann | Apr. 10, 1917 |
| 1,775,313 | Lellep | Sept. 9, 1930 |
| 1,789,895 | Fassotte | Jan. 20, 1931 |
| 1,992,704 | Lellep | Feb. 26, 1935 |
| 2,052,329 | Wendeborn | Aug. 25, 1936 |
| 2,090,868 | Hyde | Aug. 24, 1937 |
| 2,143,905 | Ahlmann | Jan. 17, 1939 |
| 2,235,261 | Labbe | Mar. 18, 1941 |
| 2,346,034 | Krauer | Apr. 4, 1944 |
| 2,356,024 | Andersen et al. | Aug. 15, 1944 |
| 2,380,056 | Lloyd | July 10, 1945 |

(Other references on following page)

UNITED STATES PATENTS

| | | |
|---|---|---|
| 2,441,383 | Babb | May 11, 1948 |
| 2,532,335 | Royster | Dec. 5, 1950 |
| 2,608,481 | Royster | Aug. 26, 1952 |
| 2,696,432 | Davis | Dec. 7, 1954 |

FOREIGN PATENTS

| | | |
|---|---|---|
| 9,007 | Great Britain | of 1905 |
| 23,038 | Great Britain | of 1911 |
| 27,762 | Great Britain | of 1912 |
| 573,539 | Great Britain | Nov. 26, 1945 |

OTHER REFERENCES

The Iron Age, March 2, 1944, pp. 46-49.

Journal of Metals, vol. 1, issue No. 11, pp. 834-837, November 1949, Ortule by Stanley et al.